United States Patent [19]

Hesp et al.

[11] Patent Number: 5,280,064
[45] Date of Patent: Jan. 18, 1994

[54] BITUMEN-POLYMER STABILIZER, STABILIZED BITUMEN-POLYMER COMPOSITIONS AND METHODS FOR THE PREPARATION THEREOF

[76] Inventors: Simon Hesp, 501-670 Sir John A. Macdonald Boulevard, Kingston, Ontario K7M 1A3; Zhizhong Liang, 22 Macklem Avenue, Toronto, Ontario M6J 3M2; Raymond T. Woodhams, 33 The Palisades, Toronto, Ontario M6S 2W9, all of Canada

[21] Appl. No.: 767,941

[22] Filed: Sep. 30, 1991

[51] Int. Cl.⁵ ............................................. C08L 95/00
[52] U.S. Cl. ...................................... 525/54.5; 524/59
[58] Field of Search .......................... 525/54.5; 524/59

[56] References Cited

U.S. PATENT DOCUMENTS 4,818,367 4/1989 Winkler ............................... 525/54.5

Primary Examiner—John Kight, III
Assistant Examiner—Rachel Johnson
Attorney, Agent, or Firm—Nikaido, Marmelstein, Murray & Oram

[57] ABSTRACT

A stabilizer for bitumen-polymer compositions. Polyethylene-bitumen compositions having the polyethylene component dispersed throughout the solution and stabilized against gross phase separation are described. A method for preparation of the stabilizer includes vulcanization of a bitumen and amine-terminated poly(-butadiene-co-acrylonitrile). Carboxylated polyethylene is coupled with the vulcanization product to obtain the stabilizer. Polyethylene dispersed in bitumen containing the stabilizer does not undergo gross phase separation and droplets in the 1 to 5 micron range are observed microscopically.

43 Claims, 1 Drawing Sheet

10μ

10μ

5,280,064

BITUMEN-POLYMER STABILIZER, STABILIZED BITUMEN-POLYMER COMPOSITIONS AND METHODS FOR THE PREPARATION THEREOF

FIELD OF THE INVENTION

This invention relates to a stabilizer for use with bitumen-polymer compositions, the stabilized compositions and methods for their preparation. Such a stabilized composition is typically for use as road surface asphalt, but could include roof waterproofing etc.

BACKGROUND OF THE INVENTION

It is well known that certain characteristics of bitumens can be improved by modification by or addition of polymeric materials. For example, European Application No. 88202562 (Publication No. 317,025, published May 24, 1989, assigned to Shell Internationale Research Maatschappij BV) discloses a bitumen composition useful in road paving applications containing an assymetric radial block copolymer which exhibits increased toughness and tenacity. Recently published PCT Application No. FR89/00453 (Publication No. WO 90/02776, assigned to Société Nationale Elf Aquitaine) discloses bitumens modified with a copolymer of styrene and a conjugated diene and a coupling agent such as sulfur.

A problem often encountered with bitumen-polymer mixtures is an incompatibility of the bitumen and polymer components. Bitumens and most polymers, especially polyolefins such as polyethylene, are not readily miscible with each other in a molten state.

One approach to overcoming this problem has been the use of another additive to form a stabilized bitumen gel as described in, for example, U.S. Pat. No. 4,018,730 (issued Apr. 19, 1977 to McDonald). This approach has the disadvantage of providing a thickened or jellied material, the higher viscosity of which has less desirable working characteristics than is desirable for conventional uses of bitumens.

More closely related to bituminous compositions obtainable with the present invention are those disclosed in, for example, U.S. Pat. No. 4,314,921 (issued Feb. 9, 1982 and assigned to Novophalt SA) and German Offenlegungsschrift 39 20 878 (published Jan. 4, 1990 and assigned to Novophalt SA). These documents disclose methods for the physical mixture i.e., homogenization of molten bitumens and thermoplastic polymers such as polyethylene. Such specialized mixing methods have heretofore been found to be necessary because of the difficulty of obtaining adequate dispersion of polymer components in the bituminous phase to provide the desired qualities in the working material produced. As described in U.S. Pat. No. 4,314,921, shearing forces which degrade the polymer are apparently necessary. Further, there is a tendency of the homogenized bitumens and polymers to undergo gross phase separation even after such homogenization. Commercial applications of the Novophalt process thus include the addition of paving components such as sand and gravel to the homogenized mixture within a relatively short period of time after the homogenization process is complete.

U.S. Pat. No. 4,154,710 of Maldonado et al. (issued May 15, 1979 to Elf Union) discloses a bitumen modified by heating bitumen in the presence of polyisobutene or a mixture of fatty acid esters (esters of oleic acid, palmitic acid, stearic acid with higher alcohols such as lanosterol, cholesterol, isocholesterol) consisting of a natural extract of mutton suet in the presence of sulphur. Apparently stable mixtures were obtained with the admixture of polymers such as, for example, isobutene-butadiene copolymer, ethylenecylcopentadiene copolymer, polybutene-polyisobutene polymers.

SUMMARY OF THE INVENTION

The present invention provides a stabilizer for use with compositions having bituminous and other organic polymer additives, methods for preparation of the stabilizer and products containing the stabilizer, such products being stabilized against gross phase separation by the stabilizer.

It is thus possible to obtain with the present invention, bitumuminous compositions having polymer components such as polyethylene and/or polypropylene, copolymers of polyethylene, etc. with the use of conventional mixing apparatus, which compositions are stable against gross phase separation.

One aspect of the invention is a method of production of the stabilizer. Preferred embodiments of the stabilizer have been found to be stable for several days, even after storage at elevated temperatures and to be suitable for stabilizing bitumen-polymer compositions after such storage. Bitumen-polymer compositions admixed with such stabilizers have been found to be stabilized against gross phase separation for several days.

Other aspects of the invention include stabilizers produced according to the method of the invention and bitumen-polymer compositions stabilized thereby. Accordingly, one preferred embodiment of the invention is road paving asphalt comprising bitumens and polyolefins such as polyethylene and/or polypropylene stabilized against gross phase separation by a stabilizer produced according to the present invention.

One broad aspect of the invention is a stabilizer comprising a bitumen-soluble first portion and a polymeric second portion, compatible with the bitumen-soluble first portion, covalently linked with the first portion. There is a polymeric third portion miscible with the polymer to be dispersed, nucleophilically linked with the second portion. In the context of this invention, a "nucleophilic linkage" is one derived from the reaction of a functional group having a nucleophilic heteroatom, such as O, N, S, etc., with an electrophilic atom such as a carbonyl carbon in an anhydride group, etc., as is understood by those skilled in the art.

A preferred method for production of a stabilizer of the present invention comprises bonding a bitumen-compatible organic polymer having a first functional group covalently to a bitumen (the bitumen-soluble portion) while leaving the functional group intact, and reacting a second functional group of a second organic polymer miscible, i.e. soluble with the organic polymer to be mixed with bitumen with the first functional group to obtain the stabilizer. In the context of this invention a polymer is compatible with bitumens if it is soluble therein or will form a highly swollen phase therewith. Thus, according to preferred embodiments, exemplified below, low molecular weight polybutadiene partially functionalized with an amino group, and asphalt are heated in the presence of sulfur to covalently bond the asphalt and the functionalized polybutadiene. This reaction proceeds via a well known radical mechanism, sulfur acting to covalently couple the asphalt and functionalized polybutadiene. Carboxylated polyethylene provides the second organic polymer of preferred embodiments, the nucleophilic amino group of the polybutadiene reacting therewith to couple the two polymers and thus produce a stabilizer of the present invention.

A stabilizer of the present invention thus has a number of characteristics. A bitumen soluble portion of the stabilizer is miscible with ordinary unreacted bitumen while a polymer portion (polyethylene of the illustrated embodiments) is miscible with the polymer additive of the bituminous composition. When a stabilizer solution or concentrate is diluted by the addition of bitumens and polymer additive, particles visible under a microscope enlarge. The inventors believe these particles are polymer droplets surrounded by stabilizer molecules which form an interface between the bitumens milieu and polymer, the polymer being generally present in smaller quantity than the bitumens. Polymer portions of the stabilizer which are soluble with the polymer additive are thus directed toward the interior of a droplet while bitumen (asphalt) portions of the stabilizer are directed outwardly into the bitumens milieu. The inventors believe the structure of the composition is maintained by "steric stabilization" or, more precisely "elastic stabilization" a general discussion of which is provided in a book entitled "Polymeric Stabilization of Colloidal Dispersions", at pages 324–329, by D. H. Napper, Academic Press, 1983.

According to preferred embodiments, the bitumen-compatible organic polymer is alkenic and may be a conjugated diene polymer. More preferably, the polymer is a polydiene having a molecular weight in the range of from about 500 to 40,000. More particularly, the polydiene has a molecular weight in the range of from about 1,000 to about 12,000.

According to preferred embodiments, the bitumen-soluble portion of the stabilizer is bitumen.

The organic polymer portion of the stabilizer is soluble with the organic polymer to be dispersed in bitumen and to be stabilized against gross phase separation. Preferrably, these components have a similar structure, and polyethyene is an example. The organic portion of the stabilizer is linked covalently to the bitumen-compatible portion, preferrably, through a nucleophilic reaction. That is, such a stabilizer is derive from reactive components in which one component includes a nucleophile and the other has an electrophile. The nucleophilic group may be an amino group, a carboxyl group, etc. Electrophiles include groups containing carbonyl groups, such as anhydrides, etc.

The bitumen-compatible portion of the stabilizer of the preferred embodiments is an alkenic polymer linked to bitumen by a radical reaction involving a sulfur donor, such as elemental sulfur.

According to one aspect of the invention, carboxylated polyethylene, an olefinic polymer, is dispersed in bitumen with a butadiene polymer functionalized with an amino group in the presence of a sulfur donor at a temperature of between about 100° C. and about 250° C. More preferrably, the temperature is between about 130° C. and 200° C. A preferrable ratio of carboxylated polyethylene to bitumen is from about 0.1 to about 10 percent by weight. More preferrably the ratio is from about 0.5 to about 5 percent by weight. The amount of sulfur is preferrably between about 0.3 percent and 3 percent of the total mixture, by weight.

One aspect of the invention is a method for stabilizing against gross phase separation a composition having a bituminous component and a first organic polymer component which involves dispersing in the composition a stabilizer produced in accordance with this invention. Preferably, the dispersion is such to obtain dispersed droplets of polymer component in the range of from about 0.1 to about 5 microns, but this is a matter of choice and the range of sizes of droplets obtained may be varied by variation of factors affecting the extent of dispersal, such as dispersal time, etc.

DETAILED DESCRIPTION OF PREFERRED EMBODIMENTS

Figure 1:
FIG. 1 shows a sample prepared according to the method of Example 1 having coalesced polyethylene particles in a bitumen as they appear after 3 hours at 160° C., at a magnification of 1650 (microscope with a heated stage).

Results of the examples described below are tabulated in Table 1.

EXAMPLE 1

In a one liter reactor, 100 parts of asphalt (Petro-Canada Bow River, Penetration 290) were heated to 150° C. Two parts of polyethylene (Esso Chemicals LL-6101, Melt Index 20) were then added and dispersed in the asphalt with a high shear mixer (Brinkman Polytron Mixer) for 30 minutes at 150° C. After mixing was stopped, the dispersion rapidly coalesced and a viscous polyethylene layer formed on the surface of the liquid asphalt which could not be readily redispersed. This lack of stability against gross phase separation is typical of polyolefin dispersions in asphalt.

EXAMPLE 2

In a one liter reactor 100 parts of asphalt (Petro-Canada Bow River, Penetration 290) were heated to 150° C. Two parts of polyethylene (Esso Chemicals LL-6101, Melt Index 20) and 0.5 parts of a carboxylated polyethylene wax (Eastman Chemicals Epolene C-16) were then added and dispersed with a high shear mixer as in Example 1. A fine dispersion was obtained in 15 minutes due to the C-16 wax but the dispersion quickly separated into readily observable phases, a viscous polyethylene surface layer being visible after the sample stood for a few hours. Although the carboxylated wax hastens dispersal of the polyethylene within the asphalt, it apparently does not stabilize the dispersion against gross phase separation once mixing is stopped.

EXAMPLE 3

Carboxylated polyethylene (0.5 parts Du Pont Fusabond D-101, Melt Index 11–18; anhydride content 0.07 g mole/kg resin) was dispersed in 25 parts asphalt (Petro-Canada Bow River 290) at 150° C. for 30 min. Then 1.4 parts liquid polybutadiene (Ricon 134, B. F. Goodrich, MW=12,000), 0.6 parts of a liquid amine-terminated poly(butadiene-co-acrylonitrile) (10 percent acrylonitrile, amine equivalent weight 200 g/mole), and 0.2 parts elemental sulfur were added in order and mixed under high shear for 2 hours at a temperature between 150° and 170° C. To this stirred mixture was added 75 parts additional asphalt (Esso Bow River 290) and 3 parts low density polyethylene (Esso Chemicals 6101, Melt Index 20). After 5 to 20 minutes dispersal was complete and no visual changes were apparent after 3 days storage at 160° C. and the viscosity remained constant at 5.09 poise over this period.

EXAMPLE 4

EXAMPLE 11

The method of Example 3 was repeated without the addition of sulfur. The resulting emulsion was unstable against gross Phase separation as evidenced by microscopic observation.

TABLE 1

Examples of Polyethylene Emulsions in Asphalt Medium

| Component, phr | 1 | 2 | 3 | 4 | 5 | 6 | 7 | 8 | 9 | 10 | 11 |
|---|---|---|---|---|---|---|---|---|---|---|---|
| Asphalt (Bow river 290) | 100 | 100 | 100 | 100 | 100 | — | 100 | 100 | 100 | 100 | 100 |
| Asphalt (Lloyd 85/100) | — | — | — | — | — | 100 | — | — | — | — | — |
| LLDPE (LL6101) | 2 | 2 | 3 | — | 3 | 3 | 2 | 1 | 1 | 3 | 3 |
| HDPE (DuPont 2914) | — | — | — | 3 | — | — | — | — | — | — | — |
| PE-g-ma | — | 0.5 | 0.5 | 0.5 | — | 0.5 | — | 0.5 | 0.5 | 0.5 | 0.5 |
| C-16 Wax+ | — | — | — | — | 1 | — | 0.5 | — | — | — | — |
| LPBD° | — | — | 1.4 | 1.4 | 1.4 | 1.4 | 0.75 | 4.2 | 0.7 | 1.4 | 1.4 |
| ATBN°° | — | — | 0.6 | 0.6 | 0.6 | 0.6 | 0.25 | 1.8 | 0.3 | — | 0.6 |
| Sulfur | — | — | 0.2 | 0.2 | 0.2 | 0.2 | 0.15 | 0.7 | 0.15 | 0.2 | — |
| Viscosity* (cP) (160° C., 50 rpm) | 114 | — | 509 | 520 | 344 | — | 175 | 607 | 216 | — | — |
| Stability | no | no | yes | yes | yes | yes | yes | yes | yes | no | no |

+ a carboxylated polyethylene wax
°ATBN: amino terminated poly(butadiene-co-acrylonitrile), liquid, acrylonitrile 10%
°LPBD: Liquid polybutadiene, Mw: around 12,000
*no obvious viscosity difference in viscosity of the stable samples before storage and after 3 days hot storage The method of Example 3 was repeated with 3 parts of linear high density polyethylene (Du Pont Sclair 2914) instead of 3 parts low density polyethylene. The resulting emulsion was stable for 3 days at 160° C. without observable changes in particle size or viscosity.

EXAMPLE 5

The method of Example 3 was repeated using 0.5 parts carboxylated polyethylene wax (Eastman Chemical Products Epolene C-16 Wax), instead of Du Pont Fusabond D-101 carboxylated polymer. This substitution also produced a stable emulsion at 160° C. This experiment demonstrates that the carboxylated polyethylene component may have a relatively low molecular weight (a wax having a molecular weight less than 10,000 g/mole) or a high molecular weight polymer (Melt Index 11-18).

EXAMPLE 6

The method of Example 3 was repeated with Lloydminster 85-100 Penetration grade asphalt (Petro-Canada Clarkson Refinery) instead of Bow River 290 asphalt. The resulting emulsion was stable at 160° C.

EXAMPLES 7-9

The method of Example 3 was repeated with variable ratios of reactants as shown in Table 1 (parts by weight). Examples 7-9 were all found to be stable at 160° C. for at least 3 days. These examples demonstrate that the viscosities and particle sizes of the emulsified particles may be adjusted by appropriate control of the reagent concentrations.

EXAMPLE 10

The method of Example 3 was repeated without the addition of 0.6 part amine terminated poly(butadiene-co-acrylonitrile). The resulting emulsion underwent gross phase separation as evidenced by microscopic observation.

While the foregoing examples illustrate preferred embodiments currently known to the inventors, it is to be understood that variations within the scope of the invention as defined by the claims may be made. For example, polyethylene is known to improve characteristics of asphalt for use in road paving applications. (U.S. Pat. No. 4,314,921) There may be other polymers such as ethylene vinyl acetate copolymers which do not readily dissolve or do not form stable mixtures with bitumens, i.e., which ordinarily undergo gross phase separation therefrom, which it may be desirable to use as bitumen additives and which may be stabilized using the approach of the invention disclosed herein. Such another polymer could thus be appropriately functionalized and covalently linked to form a stabilizer having a bitumen-miscible portion.

Polybutadiene, used in the preceding examples is compatible with bitumens, this property making it appropriate for that part of the stabilizer-forming reaction for which it was chosen. Further, the polybutadiene of the examples was partially functionalized with an amino nucleophilic group and the polyethylene portion of the stabilizer contained a reactive electrophilic carboxyl group, but a skilled person would understand that these groups could have been interchanged, or other suitable nucleophile-electrophile pair, or other pair of reactive functional groups could have been chosen. For example, other known nucleophiles include hydroxyl, carboxyl, sulfhydryl etc. and known electrophiles include anhydrides, carboxyl and other carbonyl containing groups, and the epoxy and isocyanate groups, etc. The amine-terminated poly(butadiene-co- acrylonitrile) of the examples is a readily available commercial product. It may be that pure amine functionalized polydiene polymers are just as or more suitable. Further, it may be that a polydiene polymer of higher molecular weight is more desirable. Other well known covalent linkages may be optimal. For example, a carboxylated polydiene polymer and a carboxylated polyolefin may be linked by a difunctional aminol, diamine or diol.

The polybutadiene was linked to the asphalt portion of the stabilizer through the use of elemental sulfur in a well known thermal radical reaction but other suitable means for linking polymers such as polybutadiene to asphalt, including, but not limited to other sulfur containing compounds, are known. Further, such a reaction may be hastened by the addition of sulfur vulcanization accelerators, such as those described, for example in PCT Application No. FR89/00453 (Publication No. WO 90 02776) and U.S. Pat. Nos. 4,237,052 and 4,242,246 (Maldonado et al.). It is believed that a degree of crosslinking between polybutadiene polymer components takes place to provide a higher molecular weight species having a larger domain, which may contribute to any steric barrier provided by the stabilizer ultimately produced. A Diels-Alder addition may provide an alternative route to covalent linkage of a polybutadiene polymer and bitumen components of the stabilizer.

Figure 2:
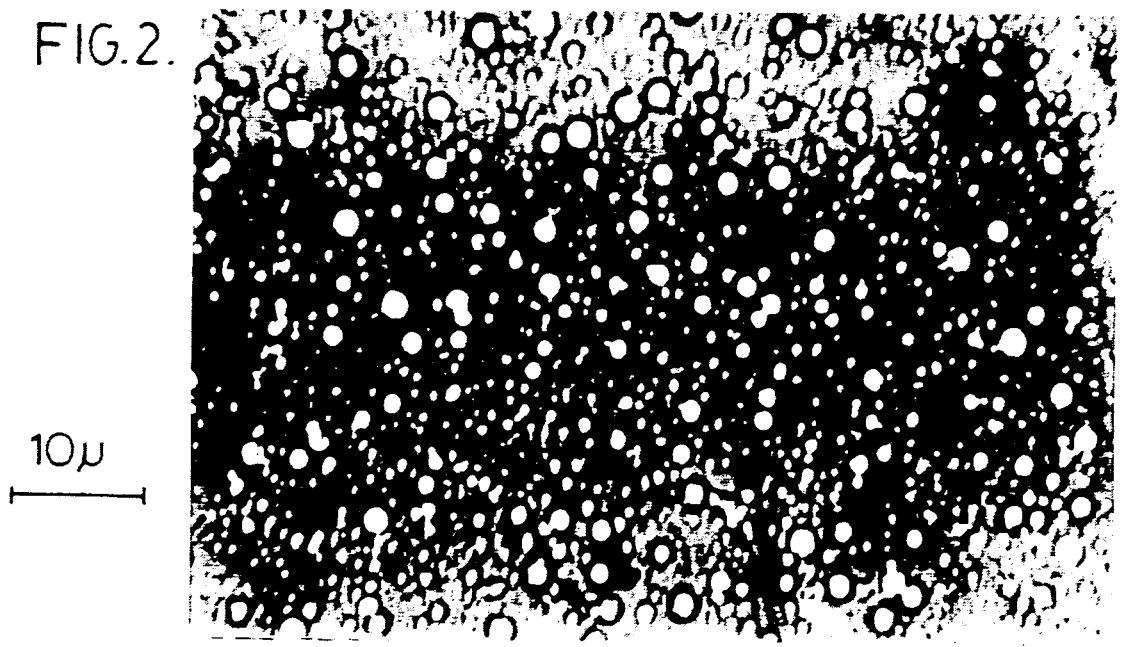
FIG. 2 shows a sample polyethylene-bitumens composition stabilized against gross phase separation as obtained using the method of Example 3, after 3 days at 160° C. at a magnification of 1650.

It should also be understood that the photographs of FIGS. 1 and 2 are of molten bitumens-polymer compositions at an elevated temperature. The coalesced state shown in FIG. 1 illustrates a system which undergoes gross phase separation. Such a system thus displays different behavior, over time, than the type of system shown in FIG. 2. The FIG. 1 system when dispersed, initially gives an appearance similar to that shown in FIG. 2, but with time the particles, whose movement is visible under a microscope, coalesce into the large polymer particles shown in FIG. 1 as polymer droplets encounter each other. On the other hand, the system of FIG. 2, although the same movement of particles is evident, does not indicate coalescence of smaller particles into larger ones such as those of FIG. 1. On a larger scale, the system of FIG. 1 undergoes readily observable gross phase separation while the system of FIG. 2 is stabilized against such gross phase separation. It will further be appreciated that the diameters of stabilized particles evident in FIG. 2 are on the order of from about 0.1 to about 1 or 2 microns.

The present invention thus provides a stabilized molten bituminous mixture having polyethylene particles which do not coalesce at elevated temperatures. The inventors have thus found that while a stabilizer having a polyethylene portion has been found to stabilize molten bituminous compositions having a polyethylene additive, those skilled in the art would understand that other compositions having polymer additives of the same type would be stabilized against gross phase separation by this stabilizer. In this context a polymer additive which is miscible with molten polyethylene, which would form stable droplets in the presence of the stabilizer as shown in FIG. 2, would thus be considered to be of the same type as polyethylene. Polyethylene and poly(ethylene-co-vinyl acetate) would thus be considered polymers of the same type.

It has been found that an effective dispersion temperature is obtained at about 30° to 50° C. above the melting point of the polymer being dispersed. Thus, polyethylene having a melting temperature of 115° to 130° C. can be dispersed at a temperature of from about 140° C. to 190° C. Commonly found low density, linear low density and high density polyethylenes may thus be dispersed and stabilized by a stabilizer of the present invention. Most polyethylene used in consumer products have melting temperatures in the acceptable range and polyethylene polymer blends, such as are obtained in pellets of recycled material would thus be suitable for dispersal in bitumens and stabilization according to the present invention.

An upper limit may be placed on the time and temperature used in dispersal of a polymer in bitumen according to the disclosed embodiments of the present invention because of the lack of stability of polybutadiene polymers above about 210° C. There may thus be some difficulty in dispersing certain polymers such as some known polymers of polypropylene which have melting points of 180° C. and higher.

There are several possible end uses for bitumen-polymer compositions. A roofing material may be obtained, for example, by the addition of suitable fillers such as asbestos, carbonates, silicas, sulfates, clays, and-/or, pigments, fire retardants such as chlorinated elastomers, etc. as is known to those skilled in the art. Paving materials may be obtained by the combination of a bitumen composition with a suitable aggregate, such as pebbles, sand, etc., again as known in the art.

What is claimed is:

1. A method for production of a stabilizer for a composition including a bituminous component and a first olefinic polymer component, which method comprises the steps of:
    a) bonding covalently a conjugated diene polymer having a first functional group to bitumen while leaving the functional group intact by heating the conjugated diene polymer and the bitumen in the presence of a linker which covalently links the bitumen and conjugated diene polymer through the radical reaction;
    b) reacting a second functional group of a second olefinic polymer soluble with the conjugated diene polymer with the first functional group to obtain the stabilizer.

2. The method of claim 1 wherein one of the first and second functional groups is a nucleophile and the other of the first and second functional groups is an electrophile, while electrophile and nucleophile react to covalently link the conjugated diene and second olefinic polymers.

3. A method for production of a stabilizer for a composition including a bituminous component and a first olefinic polymer component, which method comprises the steps of:
    a) bonding covalently a conjugated diene polymer having a first functional group to a bitumen while leaving the functional group intact; and
    b) reacting a second functional group of a polyolefin soluble with the first olefinic polymer with the first functional group to obtain the stabilizer by dispersing a polyolefin having a second functional group in molten bitumen.

4. The method of claim 3 wherein the bonding step includes mixing the conjugated diene polymer in molten bitumen in the presence of a linker which covalently links the polydiene to the bitumens by a radical reaction.

5. A method for production of a stabilizer for a composition including a bituminous component and a first olefinic polymer component, which method comprises the steps of:
    (a) mixing a conjugated diene polymer having a nucleophilic first functional group with a first portion of molten bitumen in the presence of a sulfur donor for coupling of the conjugated diene polymer and the bitumen by means of a radical reaction; and (b) dispersing a second olefinic polymer having an electrophilic functional group in a second portion of molten bitumen and mixing the first and second portions of molten bitumen to effect reaction between the functional groups to obtain the stabilizer.

6. The method of claim 5 wherein the conjugated diene polymer is a liquid polybutadiene.

7. The method of claim 6 wherein the first functional group is an amino group and the second functional group has a carbonyl group.

8. The method of claim 7 wherein the second functional group is a carboxyl or anhydride group, or mixture thereof.

9. The method of claim 8 wherein the sulfur donor is elemental sulfur.

10. The method of claim 9 wherein the second olefinic polymer includes polyethylene.

11. The method of claim 10 wherein the polyethylene is carboxylated.

12. The method for production of a mixture containing a stabilizer for a composition including a bituminous component and a first olefinic polymer component, which method comprises the steps of:
   a) dispersing a second olefinic polymer of the same type as the first olefinic polymer, which second olefinic polymer has an electrophilic or nucleophilic second functional group, in molten bitumen;
   b) blending a bitumen-compatible conjugated diene polymer having a first functional group reactive with the second functional group of the second olefinic polymer, with the bitumen so as to react the functional groups and covalently link the second olefinic and diene polymers; and
   c) blending a sulfur donor with the molten bitumen containing the diene polymer so as to vulcanize a portion of the bitumen and the diene polymer.

13. The method of claim 12 wherein steps (a), (b) and (c) are carried out simultaneously.

14. The method of claim 12 wherein the first olefinic polymer is polyethylene; the second olefinic polymer includes carboxylated polyethylene; the conjugated diene polymer is a butadiene polymer having an amino functional group; and steps (a), (b) and (c) are carried out at a temperature between about 100° C. and about 250° C.

15. The method of claim 12 wherein the first olefinic polymer is polyethylene; the second olefinic polymer includes carboxylated polyethylene; the conjugated diene polymer is a butadiene polymer having an amino functional group; and steps (a), (b) and (c) are carried out at a temperature between about 130° C. and about 200° C.

16. The method of claim 14 wherein the ratio of carboxylated polyethylene to bitumen dispersed in step (a) is from about 0.1 percent to about 10 percent by weight.

17. The method of claim 14 wherein the ratio of carboxylated polyethylene to bitumen dispersed in step (a) is from about 0.5 percent to about 5 percent by weight.

18. The method of claim 16 wherein between about 0.3 percent and about 3 percent of the mixture by weight of sulfur is blended in step (c).

19. The method of claim 18 wherein step (a) is carried out for at least three minutes.

20. The method of claim 19 wherein step (b) is carried out for at least five minutes.

21. The method of claim 20 wherein step (c) is carried out for at least thirty minutes.

22. A stabilizer prepared in accordance with the method of claim 1.

23. A stabilizer prepared in accordance with the method of claim 2.

24. A stabilizer prepared in accordance with the method of claim 3.

25. A stabilizer prepared in accordance with the method of claim 4.

26. A stabilizer prepared in accordance with the method of claim 5.

27. A stabilizer prepared in accordance with the method of claim 6.

28. A stabilizer prepared in accordance with the method of claim 7.

29. A stabilizer prepared in accordance with the method of claim 12.

30. A stabilizer prepared in accordance with the method of claim 13.

31. A stabilizer prepared in accordance with the method of claim 14.

32. A stabilizer prepared in accordance with the method of claim 15.

33. A stabilizer prepared in accordance with the method of claim 16.

34. A method for stabilizing against gross phase separation a composition having a bituminous component and a first olefinic polymer component dispersed therein comprising the step of dispersing in the composition a stabilizer comprising a conjugated diene polymer covalently linked to bitumen coupled to a second olefin polymer, wherein the first and second olefin polymers are miscible with each other.

35. A method for stabilizing against gross phase separation of a composition having a bituminous component and a first olefinic polymer, comprising the step of dispersing within the composition the first olefinic polymer and a stabilizer produced in accordance with claim 1.

36. The method of claim 35 wherein the first olefinic polymer and the stabilizer are dispersed in the composition to obtain dispersed droplets of the first olefinic polymer in the range of about 0.1 to about 5 microns.

37. The method of claim 35 wherein the first olefinic polymer component and the stabilizer are dispersed in the composition to obtain dispersed droplets of the first olefinic polymer at least as small as 5 microns.

38. A stabilizer for use in stabilizing a molten mixture including bitumens and a first olefinic polymer against gross phase separation, comprising:
   bitumen;
   a conjugated diene polymer, vulcanized with the bitumen; and
   a second olefinic polymer miscible with the first olefinic polymer, and nucleophilically linked with the conjugated diene polymer.

39. The stabilizer of claim 38 wherein the conjugated diene polymer is a polybutadiene polymer, and the conjugated diene polymer and second olefinic polymer are linked by an amide linkage.

40. The stabilizer of claim 39 wherein the first olefinic polymer includes polyethylene and the second olefinic polymer includes a polyethylene portion.

41. The stabilizer of claim 14 wherein the polybutadiene polymer has a molecular weight in the range of from about 500 to about 40,000.

42. The stabilizer of claim 41 wherein the polybutadiene polymer has a molecular weight in the range of from about 1,000 to about 12,000.

43. The stabilizer of claim 38 wherein the first and second olefinic polymers are selected from the group of polyethylene, polypropylene, copolymers thereof or mixtures thereof.

* * * * *